US006808822B2

(12) United States Patent
Rajan et al.

(10) Patent No.: US 6,808,822 B2
(45) Date of Patent: Oct. 26, 2004

(54) MULTILAYERED SHRINK FILMS AND LABELS MADE THEREFROM

(75) Inventors: Sundar Rajan, Mentor, OH (US); John E. Kovalchuk, Mentor, OH (US); Christopher Blackwell, Willoughby Hills, OH (US); Dana Boyd, Painesville, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/272,644

(22) Filed: Oct. 16, 2002

(65) Prior Publication Data

US 2003/0134062 A1 Jul. 17, 2003

Related U.S. Application Data

(60) Provisional application No. 60/359,822, filed on Feb. 25, 2002, and provisional application No. 60/329,975, filed on Oct. 17, 2001.

(51) Int. Cl.⁷ .............................................. B32B 27/32
(52) U.S. Cl. ...................... 428/516; 428/910; 428/34.9
(58) Field of Search ................................ 428/516, 910, 428/34.9, 76

(56) References Cited

U.S. PATENT DOCUMENTS

| | | | |
|---|---|---|---|
| 3,032,463 A | 5/1962 | Morgan ...................... 156/253 |
| 3,358,902 A | 12/1967 | Emmert et al. ............... 229/43 |
| 3,468,412 A | 9/1969 | Forman ...................... 206/46 |
| 3,523,052 A | 8/1970 | Bolen ........................ 156/521 |
| 3,634,552 A | 1/1972 | Foglia et al. ................ 260/897 |
| 3,634,553 A | 1/1972 | Foglia et al. ................ 260/897 |
| 3,754,063 A | 8/1973 | Schirmer ..................... 264/22 |
| 3,832,274 A | 8/1974 | Owston ....................... 161/183 |
| 3,849,520 A | 11/1974 | Bullard et al. ............... 260/897 |
| 3,873,018 A | 3/1975 | Donnay ....................... 229/51 |
| 3,891,008 A | 6/1975 | D'Entremont ............... 138/146 |
| 3,900,534 A | 8/1975 | Schard ........................ 260/897 |
| 4,013,494 A | 3/1977 | Patterson ..................... 156/86 |
| 4,072,553 A | 2/1978 | Braker et al. ................ 156/423 |
| 4,138,026 A | 2/1979 | Conklin ........................ 215/2 |
| 4,194,039 A | 3/1980 | Mueller ....................... 428/213 |
| 4,196,240 A | 4/1980 | Lustig et al. ................. 428/35 |
| 4,207,363 A | 6/1980 | Lustig et al. ................. 428/35 |
| 4,233,331 A | 11/1980 | Lemke et al. ............... 426/407 |
| 4,379,888 A | 4/1983 | Yoshimura et al. ......... 525/211 |
| 4,392,898 A | 7/1983 | Pithouse et al. .............. 156/85 |

(List continued on next page.)

FOREIGN PATENT DOCUMENTS

| | | |
|---|---|---|
| JP | 59-123160 | 7/1984 |
| WO | 96/18501 | 6/1996 |
| WO | 97/18083 | 5/1997 |
| WO | 00/27631 | 5/2000 |

OTHER PUBLICATIONS

International Search Report, Application No. PCT/US99/26222, dated Feb. 16, 2000.
Shrink–wrap–guide.com; Your Guide to Buying Shrink Wrap.
U.S. application Ser. No. 10/054,620, filed Jan. 22, 2002.

*Primary Examiner*—D. Lawrence Tarazano
(74) *Attorney, Agent, or Firm*—Renner, Otto, Boisselle & Sklar, LLP

(57) ABSTRACT

The present invention relates to a halogen-free, multilayered, uniaxially oriented heat shrink film comprising (A) a core layer comprising a blend of polyolefins; (B) a first skin layer on the upper surface of the core layer, and (C) a second skin layer on the lower surface of the core layer, wherein the first and second skin layers independently comprise a polyolefin blend and wherein the shrinkage of the film is at least about 40% in the machine direction at 270° F. The present invention further relates to a label having an adhesive applied to at least a portion of at least one of the skin layers of the multilayered heat shrink film. The heat shrink labels of the present invention are used to encapsulate articles.

38 Claims, 7 Drawing Sheets

U.S. PATENT DOCUMENTS

| | | | |
|---|---|---|---|
| 4,416,714 A | 11/1983 | Hoffmann | 156/86 |
| 4,551,380 A | 11/1985 | Schoenberg | 428/218 |
| 4,612,245 A | 9/1986 | Mueller et al. | 428/340 |
| 4,756,415 A | 7/1988 | Call | 206/333 |
| 4,766,178 A | 8/1988 | Hwo | 525/240 |
| 4,769,421 A | 9/1988 | Hwo | 525/240 |
| 4,801,514 A | 1/1989 | Will et al. | 429/167 |
| 4,834,826 A | 5/1989 | Abe et al. | 156/344 |
| 4,904,324 A | 2/1990 | Heider | 156/214 |
| 4,971,197 A | 11/1990 | Worley | 206/333 |
| 5,190,609 A | 3/1993 | Lin et al. | 156/85 |
| 5,208,096 A | 5/1993 | Dohrer | 428/218 |
| 5,212,009 A | 5/1993 | Peiffer | 428/220 |
| 5,234,733 A | 8/1993 | Schloegl et al. | 428/36.91 |
| 5,242,650 A * | 9/1993 | Rackovan et al. | 264/509 |
| 5,264,277 A | 11/1993 | Frognet et al. | 428/315.5 |
| 5,272,016 A | 12/1993 | Ralph | 428/515 |
| 5,407,723 A | 4/1995 | Curtin | 428/124 |
| 5,443,895 A | 8/1995 | Peiffer et al. | 428/220 |
| 5,494,717 A | 2/1996 | Peiffer et al. | 428/34.9 |
| 5,534,276 A | 7/1996 | Ennis | 426/127 |
| 5,585,193 A | 12/1996 | Josephy et al. | 428/515 |
| 5,691,043 A * | 11/1997 | Keller et al. | 428/212 |
| 5,709,937 A | 1/1998 | Adams et al. | 428/332 |
| 5,735,404 A | 4/1998 | Kumakura et al. | 206/469 |
| 5,759,648 A | 6/1998 | Idlas | 428/34.9 |
| 5,851,640 A | 12/1998 | Schuhmann et al. | 428/200 |
| 5,888,640 A * | 3/1999 | Marotta et al. | 428/308.4 |
| 5,942,326 A | 8/1999 | Ecoff et al. | 428/341 |
| 5,948,513 A | 9/1999 | Turnbull et al. | 428/201 |
| 5,962,092 A | 10/1999 | Kuo et al. | 428/34.9 |
| 6,113,996 A * | 9/2000 | Amon et al. | 428/34.9 |
| 6,303,233 B1 * | 10/2001 | Amon et al. | 428/516 |
| 6,322,883 B1 * | 11/2001 | Williams | 428/308.4 |
| 6,436,496 B1 * | 8/2002 | Rackovan et al. | 428/34.9 |
| 6,534,189 B1 * | 3/2003 | Burns et al. | 428/447 |
| 2003/0054165 A1 * | 3/2003 | Yamanaka et al. | 428/343 |
| 2003/0134062 A1 * | 7/2003 | Rajan et al. | 428/34.9 |

* cited by examiner

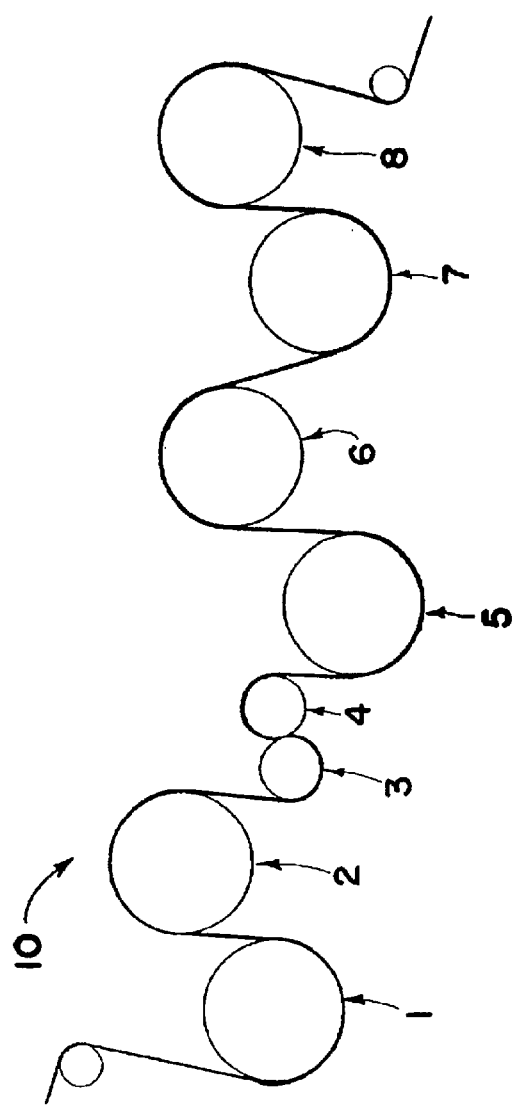
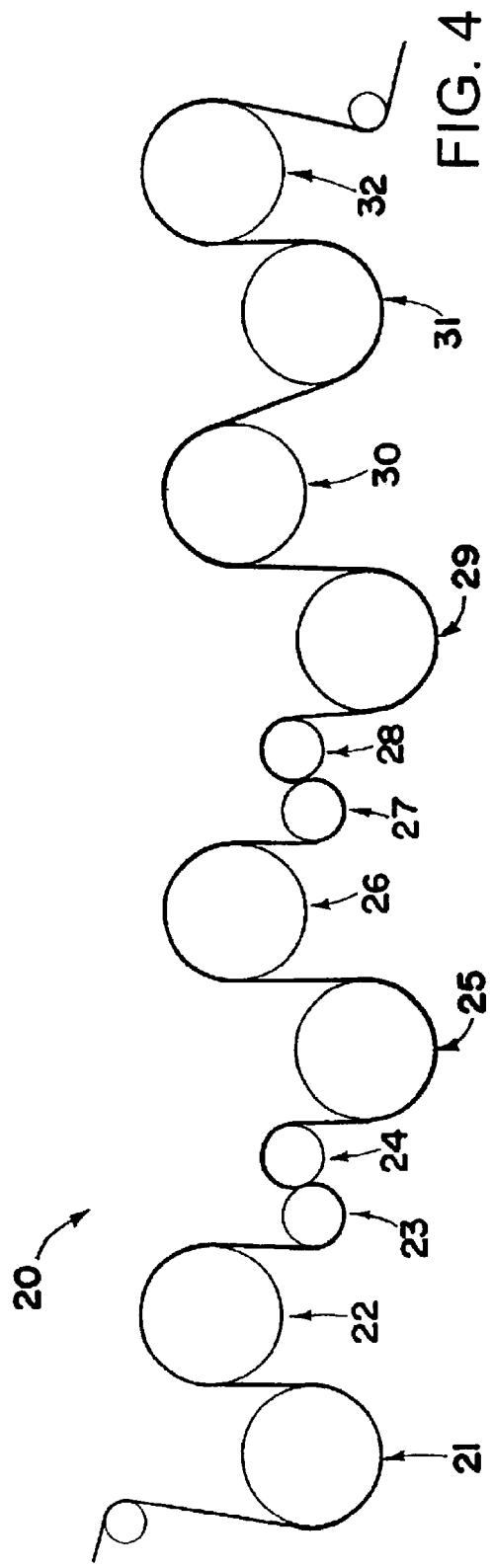

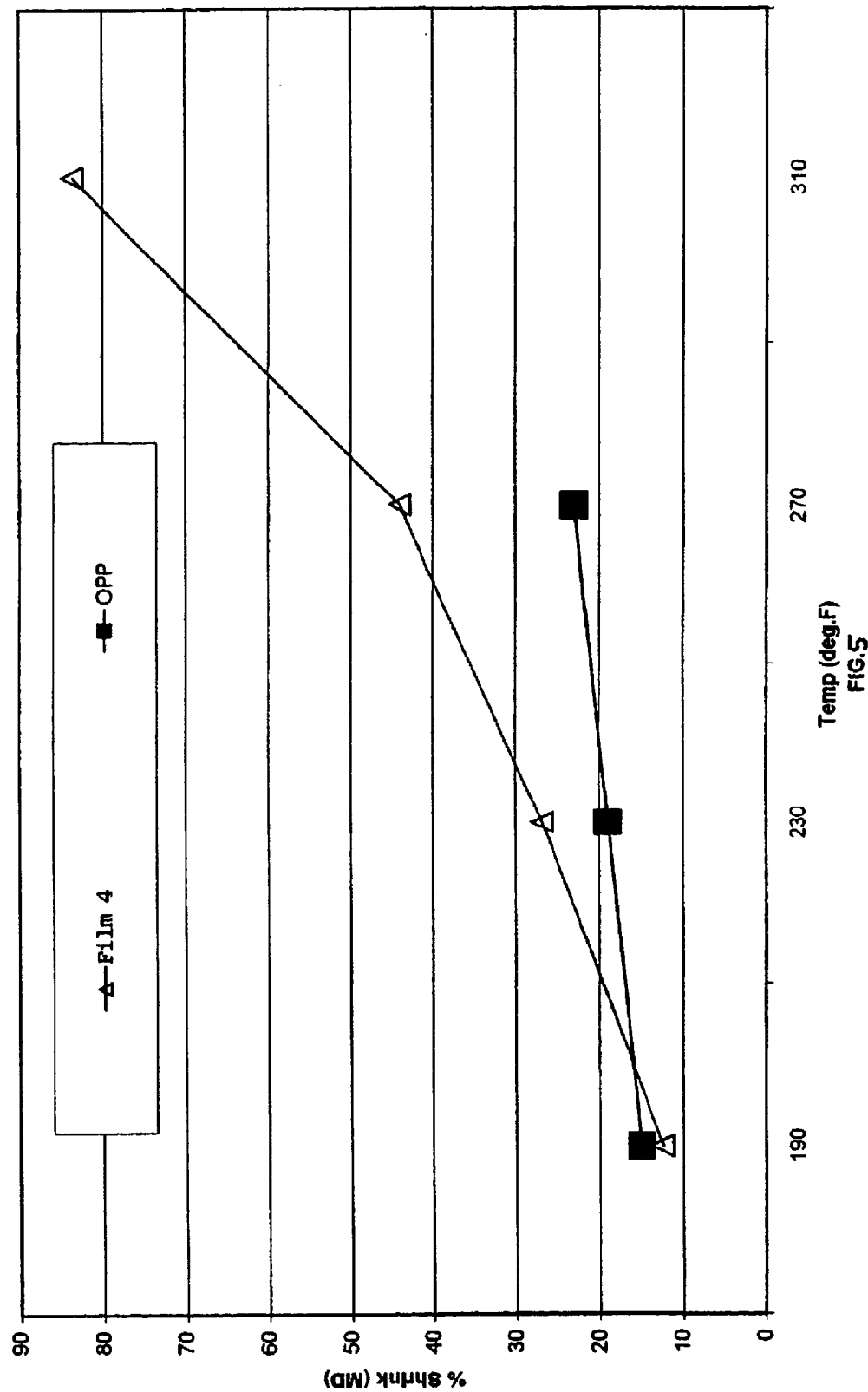

MULTILAYERED SHRINK FILMS AND LABELS MADE THEREFROM

This application claims the benefit of U.S. Provisional Applications Nos. 60/329,975 filed Oct. 17, 2001 and 60/359,822 filed Feb. 25, 2002, which are hereby incorporated herein by reference in their entirety.

TECHNICAL FIELD OF THE INVENTION

This invention relates to a multilayered, uniaxially oriented shrink film. More specifically, the invention relates to halogen-free multilayered shrink films useful in labeling articles.

BACKGROUND OF THE INVENTION

Shrink film has been used for years to encapsulate articles. The shrink film must be able to shrink sufficiently to provide a smooth consistent package. Previously, shrink films have been polyolefins and polyolefin blends, polyethylene terephthalate glycol (PETG), vinyl and styrene films that were and are used extensively in the food and packaging industry to protect and preserve articles, such as food. Shrink films are also used to label containers. Initially, labeling operations were carried out using processes and methods that required the formation of a tube or sleeve of the heat shrink film which was then placed over the container and heated in order to shrink the film to conform to the size and shape of the container.

More recent packaging processes do not require a preformed sleeve and permit the application of the film directly from a continuous roll of film material onto the container. High speed continuous operations generally employ biaxially oriented polypropylene shrink films. Such polypropylene shrink films have the ability to shrink up to about 25% in the machine direction as tested per ASTM Method D 1204. However, it is often desirable to obtain a shrinkage greater than 25%. New containers being introduced into the market have ergonomic features, with contours that have high shrink demand. Such containers require labels that shrink to greater than 25%.

Polyvinyl chloride (PVC) films provide acceptable shrinkages of about 40%. However, such PVC shrink films do not have sufficient heat stability. After formation of the shrink film, the film should not shrink prematurely. Often the film is exposed to relatively high temperatures after formation, such as in transport. It is desired that the shrink film not shrink until application with heat to the bottle or article. Another disadvantage of PVC shrink films is the potential environmental impact of PVC film. Concern over the adverse affect of halogens on the ozone layer has lead to efforts to provide halogen free shrink films.

As an additional consideration, high speed continuous operations require the use of an adhesive that will form an adequate bond between the container and the label. More specifically, the bond must be such that it will not separate at the seam during the heat shrinking step. The bond should also form a smooth package which will not bubble or cause creasing of the film during application. As the level of shrinkage desired is increased, the adhesive used in the high speed applications must be able to provide an adequate bond while maintaining an acceptable appearance, e.g., without distortion. The adhesive must be compatible with the particular shrink film material used.

It is desirable to have a film that provides high shrinkage, e.g. shrinkage of 25% and higher. It is also desirable to have the films be halogen free. Additionally, it is desirable to have labels that can be applied using a continuous roll process and that can be applied at high speeds.

U.S. Pat. No. 4,194,039, issued to Mueller, relates to a multi-layered polyolefin shrink film. The film has three layers comprising a core layer of a blend of ethylene-vinyl acetate copolymer with ethylene-butylene copolymer and each skin layer of ethylene-propylene copolymer.

U.S. Pat. No. 4,196,240, issued to Lustig et al, relates to heat shrinkable multilayer packaging film of blended copolymers and elastomers. The multilayer film includes a first outer layer comprising a blend of propylene-ethylene copolymer having a high isotactic molecular structure with less than about 6% by weight being ethylene and having a melt flow of from about 1.5 to about 18 decigrams per minute; and (butene-1)-ethylene copolymer having a high isotactic molecular structure with less than about 10% by weight ethylene and having a melt flow of about 0.1 to about 5.0 decigrams per minute, and a thermoplastic elastomer selected from the group consisting of ethylene-propylene copolymers and ethylene-propylene diene terpolymers, the ratio of the weight of the propylene-ethylene copolymer to the (butene-1)-ethylene copolymer being from 2:1 to about 1:2 and the thermoplastic elastomer being present from about 10% to about 50% by weight. The multilayer film also has an outer layer comprising an ethylene-(butene-1) copolymer having a melt flow of from about 0.1 to about 1 decigram per minute, having a density of from about 0.916 to about 0.920 gram per cubic centimeter, and being a linear polymer. The multilayer film is also biaxially oriented.

U.S. Pat. No. 4,207,363, issued to Lustig et al, relates to flexible heat-shrinkable multilayer film for packaging primal meat. The multilayer film includes (1) a first outer layer comprising a blend of a propylene-ethylene copolymer, a (butene-1)-ethylene copolymer and a thermoplastic elastomer selected from the group consisting of ethylene-propylene copolymers and ethylene-propylene diene terpolymers; (2) a first core layer connected to the first outer layer and being capable of being stretched during the biaxial orientation of the multilayer film and comprising an extrudable adhesive; (3) a second core layer connected to the first core layer and serving as an oxygen barrier to prevent the meat cut from spoilage and being compatible to the biaxial orientation and heat shrinking of the film; and (4) a second outer layer comprising an ethylene vinyl acetate copolymer. The multilayer film is biaxially oriented.

U.S. Pat. No. 5,190,609, issued to Lin et al, relates to stable pressure sensitive shrink label technique. The heat shrink labels are formed from a polyolefin, such as a polypropylene, and have a permanent acrylic pressure sensitive adhesive on one side thereof and may be mounted on a release coated backing strip. A metallized layer and open style graphics may be applied to the labels. The graphics may be protected by varnish or a second layer of heat shrinkable polyolefin material.

U.S. Pat. No. 5,443,895, issued to Peiffer et al, relates to multilayer transparent polyolefin film for application in shrink labeling. The heat shrinkable film comprises a base layer prepared from a polypropylene-containing polymer and a hydrocarbon resin. The base layer contains about 5 to 40% by weight of a polypropylene homopolymer, 0 to about 30% by weight of a hydrogenated hydrocarbon resin having a softening point in the range from about 80 to 125° C. and from about 30 to 95% by weight of a random ethylene-propylene copolymer.

U.S. Pat. No. 5,494,717, issued to Peiffer et al, relates to matte, biaxially oriented, multilayer polypropylene film of high shrinkage, and processes of making the same. The multilayer polypropylene film comprises at least one base layer containing a propylene polymer and a propylene polymer mixture in at least one outer layer that comprises a mixture or a blend. The mixture contains copolymers and terpolymers of alpha olefins containing 2 to about 10 carbon atoms and high density polyethylene.

U.S. Pat. No. 5,691,043, issued to Keller et al, relates to uniaxially shrinkable biaxially oriented polypropylene film and it method of preparation. The polypropylene film comprises a polypropylene-containing core layer comprising at least 70% by weight of said multilayer film and at least one polyolefin-containing skin layer adjacent to the core layer. The core layer is prepared by biaxially orienting a coextrudate and thereafter orienting said coextrudate by stretching 10 to 40% in the machine direction. The core layer contains isotactic polypropylene and a modifier which reduces the crystallinity of the polypropylene by increasing chain imperfections or reducing isotacticity of the polypropylene containing core. The modifiers include atactic polypropylene, syndiotactic polypropylene, ethylene-propylene copolymer, propylene-butylene copolymer, ethylene-propylene-butylene terpolymer and linear low density polyethylene. The skin layers are selected from the group consisting of polypropylene, ethylene-propylene copolymer, polyethylene and ethylene-propylene-butylene terpolymer.

SUMMARY OF THE INVENTION

The present invention relates to a halogen-free, uniaxially oriented multilayered heat shrink film comprising (A) a core layer comprising a blend of (i) a copolymer of propylene with an alpha olefin and (ii) a homopolymer of propylene or butylene, or a copolymer of butylene with an alpha olefin, the core having an upper and lower surface; (B) a first skin layer on the upper surface of the core layer; and (C) a second skin layer on the lower surface of the core layer, wherein each skin layer independently comprises a copolymer of ethylene or butylene with an alpha olefin and wherein the ultimate shrinkage of the film is at least about 40% at 270° F. (132° C.).

In another embodiment, each of the skin layers, B and C, of the uniaxially oriented multilayered heat shrink film comprises a a blend of (i) a homopolymer of propylene or a hompolymer of butylene or a copolymer of butylene with an alpha olefin and (ii) a copolymer of propylene with an alpha olefin.

The invention further relates to a halogen-free, uniaxially oriented multilayered heat shrink label comprising (A) a core layer comprising a blend of (i) a copolymer of propylene with an alpha olefin and (ii) a homopolymer of propylene or butylene, or a copolymer of butylene with an alpha olefin, the core having an upper and lower surface; (B) a first skin layer on the upper surface of the core layer; and (C) a second skin layer on the lower surface of the core layer, wherein each skin layer independently comprises a blend of (i) a homopolymer of propylene or a homopolymer of butylene or a copolymer of butylene with an alpha olefin and (ii) a copolymer of propylene with an alpha olefin; and (D) an coated on at least a portion of at least one of the skin layers, wherein the ultimate shrinkage of the label is at least about 40% at 270° F. (132° C.).

The invention further relates to articles, including articles such as bottles and containers. The films have good shrinkage and heat stability, and the labels produced from the films may be applied at high speeds using a continuous roll process.

The invention further relates to a process for making a uniaxially oriented heat shrink label having an instantaneous shrinkage of at least 30% at 275° F. (135° C.).

BRIEF DESCRIPTION OF THE DRAWINGS

FIG. 3 is a diagram of an apparatus for single-stage stretching for the uniaxially oriented film of the present invention.

FIG. 4 is a diagram of an apparatus for two-stage stretching for the uniaxially oriented film of the present invention.

FIG. 5 is a plot of the percent ultimate shrinkage vs. temperature for the film of the present invention as compared to an oriented polypropylene film of the prior art.

DETAILED DESCRIPTION OF THE INVENTION

The present invention relates to the use of multilayer shrink films and labels produced therefrom. The films and labels are uniaxially shrinkable and have a shrinkage of greater than 40%. The shrinkage is determined ASTM Method D 1204 and ASTM Method D 2732. These films are oriented in the machine direction, e.g. uniaxially oriented. The film typically has a thickness from about 0.5 to about 12, or from about 1 to about 8, or from about 1.5 to about 5 mils. Here and elsewhere in the specification and claims, the range and ratio limits may be combined.

Figure 1:
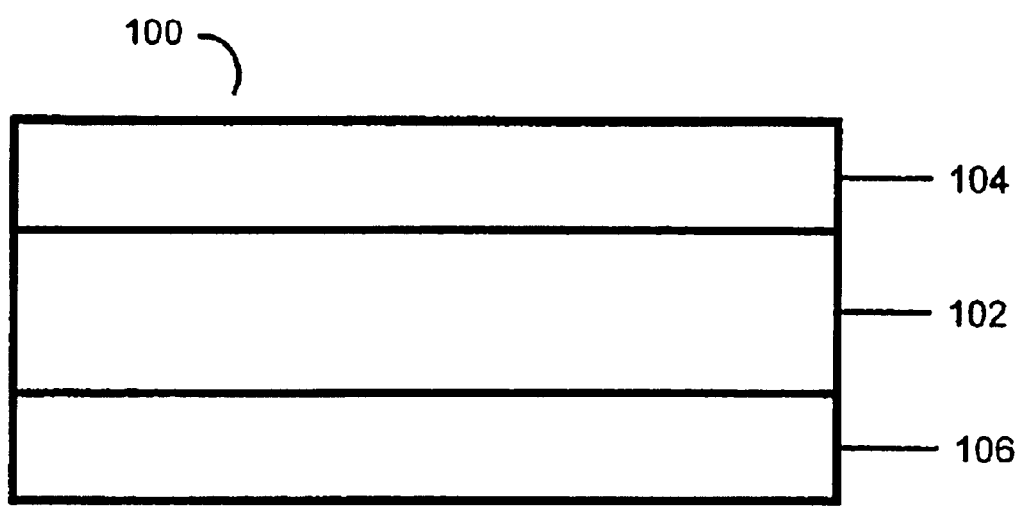
FIG. 1 is a fragmentary cross-section of a film construction useful in the present invention.

The films and labels of the present invention are illustrated in reference to the attached drawings. FIG. 1 is a cross section area of a film of the present invention. Film 100 is a coextrudate that comprises core layer 102, first skin layer 104 on the upper surface of the core layer and second skin layer 106 on the lower surface of the core layer.

Figure 2:
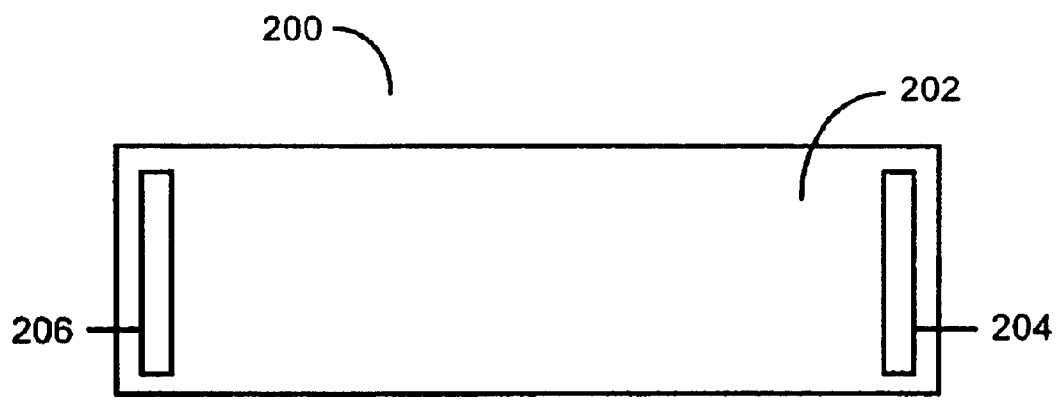
FIG. 2 is a top plan view of a label construction useful in the present invention.

FIG. 2 is a top view of a label of the present invention. Label 200 has adhesive strip 204 on the leading edge and adhesive strip 206 on the trailing edge of the upper surface of skin layer 202.

As used herein, the term "ultimate shrinkage" means the maximum shrinkage the film is capable of achieving at a particular shrink temperature, as measured by ASTM Method D 1204. The term "instantaneous shrinkage" means the shrinkage obtained when the film is exposed to the shrink temperature for less than 1 second. The instantaneous shrinkage of a particular film is determined by extrapolating the shrinkage percentage obtained for the film using ASTM Method D 2732 for immersion times of 10, 20, 40, 60, 120 and 240 seconds at a specified shrinkage temperature.

The core layer comprises a major portion of the shrink film. Typically, the core layer has a thickness from about 0.6 to about 4, or from about 0.8 to about 3, or from about 1 to about 2.5, or from about 1.2 to about 2 mils thick. The films have sufficient strength to be printed by flexographic and gravure printing. These films generally have a Young's modulus from about 100,000 to about 500,000, or from about 125,000 to about 400,000, or from about 150,000 to about 300,000 psi. Young's modulus is determined by ASTM Method D 882.

As described above, the multilayered shrink films have a core layer comprised of a blend of (i) a copolymer of propylene with an alpha olefin and (ii) a homopolymer of propylene or butylene or a copolymer of butylene with an alpha olefin. The copolymers of propylene generally have a melt flow of about 2 to about 8 g/10 min., or from about 3 to about 5 g/10 min. The alpha olefins have from about 2 to about 12, or from about 2 to about 8 carbon atoms. The alpha olefins include ethylene, 1-butene, 1-pentene, 1-hexene, 1-heptene, 1-octene, etc. Preferred alpha olefins are ethylene and 1-butene.

The copolymers may be obtained, for example, by copolymerization of propylene with an alpha olefin, such as ethylene or 1-butene. Useful propylene-butylene copolymers include those containing up to about 20% of butylene, and more often, up to about 15% butylene. Copolymers having a butylene content of from about 5% to about 15% are particularly useful. Examples of such propylene copolymers include SRD4-127, a random copolymer of propylene and 1-butene containing about 8% by weight of butene available from Dow Chemical. This propylene copolymer is characterized as having a melt flow of 8 g/10 min. Similar copolymers include SRD4-126, SRD4-128, SRD4-130, and SRD4-131. Polypropylene SRD4-104 is a random copolymer of propylene and 1-butene containing about 11% butene. This polymer is also available from Dow Chemical and is characterized as having a melt flow of 5.0 g/10 min. Another useful propylene and 1-butene copolymer is DS4D05, commercially available from Dow Chemical. This copolymer has 14% butylene and a melt flow of about 5.5 g/10 min.

In one embodiment, the propylene copolymer is a propylene-ethylene copolymer. Useful propylene-ethylene copolymers include those containing up to about 10% of ethylene, and more often, up to about 6% ethylene. Copolymers having an ethylene content of from about 0.2% to about 10% are particularly useful. Preferably, the ethylene content of the copolymer is from about 3% to about 10% by weight and more preferably, from about 3% to about 6% by weight. Examples of the types of propylene copolymers useful in the present invention include Polypropylene DS6D20, a propylene random copolymer containing about 3.2% by weight of ethylene available from Dow Chemical. This polymer has a melt flow of 1.9 g/10 min. Polypropylene DS6D81 is a polypropylene random copolymer available from Dow Chemical containing 5.5% by weight of ethylene. This random copolymer is characterized as having a melt flow of 5.0 g/10 min. Other random copolymers commercially available from Dow Chemical include Polypropylene 6E77 having an ethylene content of 0.5% and a melt flow rate of 3.5 g/10 min., Polypropylene 6D21 having an ethylene content of 3.7% and a melt flow rate of 8.0 g/10 min., and Polypropylene 6D82 having an ethylene content of 5.5 and a melt flow rate of 7.0 g/10 min.

In one embodiment, a homopolymer of propylene is blended with the propylene copolymer described above. The propylene homopolymer generally has a melt flow rate of 2.0 to 12 g/10 min. In one embodiment, the propylene homopolymer is an atactic polypropylene. In another embodiment, the propylene homopolymer is a syndiotactic polypropylene. An example of a propylene homopolymer useful in the present invention is the homopolymer identified as 5A97 available from Dow Chemical. This homopolymer is characterized as having a melt flow rate of 3.9 g/10 min. Other propylene homopolymers commercially available from Dow Chemical include 5A95 having a melt flow rate of 10 g/10 min., 5E66 having a melt flow rate of 8.5 g/10 min. and 5D98 having a melt flow rate of 3.4 g/10 min.

In one embodiment, syndiotactic polypropylene is blended with the propylene copolymer. Syndiotactic polypropylene is a polypropylene having a high syndiotacticity, such that the syndiotactic index or [r] value obtained from NMR data is at least 0.7. Such syndiotactic polypropylene is described in U.S. Pat. Nos. 5,476,914 and 6,184,326, incorporated herein by reference. Commercially available syndiotactic polypropylene useful in the present invention includes those available from Atofina under the trade designations Finaplas 1471, 1571 and 1251.

In another embodiment, a homopolymer of butylene or a copolymer of butylene with an alpha olefin is blended with the propylene copolymer described above. The copolymer of butylene with an alpha olefin may comprise a copolymer of butylene with any one of ethylene, propylene, butylene, pentene, hexene, heptene, octene, nonene, decene, etc. Particularly useful are butylene-ethylene copolymers. The butylene-ethylene copolymer typically includes ethylene at a level of about 0.5% to about 12%, or of about 1% to about 10%, or from about 1.5% to about 8%. Examples of useful butylene-ethylene copolymers are those available from Basell under the trade designation PB 8220, which has an ethylene content of 2% and a melt flow of 2.0 g/10 min, and under the trade designation PB 8310, which has an ethylene content of 6% and a melt flow of 3.2 g/10 min. Examples of butylene homopolymers include those identified as 0200 (melt flow of 1.8 g/10 min) and 0300 (melt flow of 4.0 g/10 min) available from Basell. The copolymer of butylene may also comprise an ethylene-propylene-butylene terpolymer.

The polyolefin blend of the core layer generally comprises from about 50% to about 95%, or from about 60% to about 80% by weight of the propylene copolymer. The blend generally comprises from about 5% to about 50%, or from about 20% to about 40% by weight of the propylene or butylene homopolymer or butylene copolymer. In one embodiment, the core layer is free of ethylene homopolymer. In another embodiment, the core layer is free of ethylene propylene copolymer.

In one embodiment of the present invention, the core layer comprises recycled polyolefin, such as for example, the polyolefin trimmed from the edges of the extruded polyolefin film described herein, e.g., up to 35% by weight, or up to 15% by weight.

Table 1 contains examples of formulations for the core layer of the present films and labels. Here and throughout the specification and claims the amounts are by weight, unless clearly indicated otherwise.

EXAMPLES

TABLE 1

|  | C1 | C2 | C3 | C4 | C5 | C6 | C7 | C8 | C9 | C10 | C11 | C12 |
|---|---|---|---|---|---|---|---|---|---|---|---|---|
| Propylene-butylene copolymer A[1] | 90 |  | 75 |  | 65 |  | 55 | 80 |  |  |  |  |
| Propylene-butylene copolymer B[2] |  | 85 |  | 70 |  | 65 |  |  |  |  |  |  |
| Polypropylene[3] | 10 |  |  |  |  |  |  | 10 |  |  |  |  |
| Polybutylene[4] |  |  | 25 | 10 |  | 25 |  | 10 |  |  |  |  |
| Butylene copolymer[5] |  | 15 |  | 20 | 35 | 10 | 45 |  | 35 |  |  |  |
| Propylene-ethylene copolymer[6] |  |  |  |  |  |  |  |  | 65 | 65 | 50 | 70 |
| Syndiotactic polypropylene[7] |  |  |  |  |  |  |  |  |  | 35 | 50 | 30 |

[1] DS4D05 (14% butylene) of Dow Chemical
[2] SRD4-127 (8% butylene) of Dow Chemical
[3] 5A97 of Dow Chemical
[4] 0200 of Basell
[5] PB 8220 of Basell
[6] DS6D20 (3.2% ethylene) of Dow Chemical
[7] EOD96-30 of Atofina The multilayer shrink film has a skin layer on both the upper surface of the ore layer and on the lower surface of the core layer. In one embodiment, the skin layers are independently composed of at least one copolymer of ethylene or butylene with an alpha olefin. In another embodiment, the skin layers are independently composed of a polyolefin blend of (i) a homopolymer of propylene or butylene and (ii) a copolymer of propylene with an alpha olefin. The melt flow of the polyolefin blend is generally in the range of from 4 to 12, or from about 5 to about 8 g/10 min. The homopolymers of propylene and butylene are described above, as are the copolymers of propylene with alpha olefins. The homopolymer of propylene may comprise syndiotactic polypropylene.

The polyolefin blend of the skin layers generally comprises from about 15% to about 95%, or from about 30% to about 80% by weight of the homopolymer of propylene or butylene. The blend generally comprises from about 5% to about 85%, or from about 20% to about 80% by weight of the propylene copolymer. In one embodiment, the polyolefin blend comprises about 50% by weight of propylene homopolymer and about 50% by weight of a copolymer of propylene and ethylene.

A particularly useful propylene copolymer is a propylene-ethylene copolymer having an ethylene content of from about 1 to about 10%, or from about 1 to about 6% by weight, based on the weight of the copolymer.

In one embodiment, at least one of the skin layers comprises a polyolefin blend and a soft polar additive. The soft polar additives (SPA) of the olefin SPA blends generally comprise random copolymers of an olefin and one or a more polar moiety. The random copolymer is softer than and is immiscible in the olefinic base materials. A presently preferred soft polar additive is ethylene vinyl acetate copolymer (EVA). In particular, a commercially available EVA which is useful contains 19% vinyl acetate and has the following characteristics: tensile modulus (1% secant), 5300 psi; ultimate tensile strength, 2150 psi; ultimate elongation, 730%; hardness, 87 Shore A. Although EVA is presently most preferred, alternative materials useful as soft polar additives in the olefin-SPA blends include ethylene methyl acrylate (EMA) and acrylonitrile butadiene rubber. These materials disclosed for use in the printable layer comprise, in one embodiment, physical blends of (1) polypropylene or copolymers of propylene and ethylene, as described above, and (2) ethylene vinyl acetate (EVA) in weight ratios ranging from 50/50 to 60/40. The soft polar additive and the olefin blends are described in U.S. Pat. Nos. 5,709,937 issued to Adams et al and 5,585,193 issued to Josephy et al, the disclosure of which is incorporated by reference.

In one embodiment, the multilayer film of the present invention comprises at least one skin layer comprising an olefin-SPA blend comprising from about 30% to about 60% by weight of SPA. In other embodiments, the olefin-SPA blend used in the skin layer will contain from about 40% to about 60% by weight of SPA, and in another embodiment, about 50% by weight of SPA.

Table 2 illustrates examples of formulations for the skin layer.

TABLE 2

|  | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|
| Polypropylene[1] | 85 | 20 | 80 | 70 |  | 85 | 65 | 70 | 50 | 50 | 50 |  |  |  |  |
| Polybutylene[2] |  | 60 |  |  | 70 |  |  |  |  |  |  |  |  |  |  |
| Propylene-butylene copolymer[3] |  | 20 | 15 | 30 |  | 15 | 35 | 15 | 50 |  |  |  |  |  |  |
| Ethylene-propylene copolymer[4] | 15 |  | 5 |  | 30 |  |  | 15 |  | 50 |  |  |  |  |  |
| Ethylene-propylene copolymer[5] |  |  |  |  |  |  |  |  |  |  | 50 | 50 | 100 | 70 | 85 |

TABLE 2-continued

| | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|
| Syndiotactic polypropylene[6] | | | | | | | | | | | | 50 | | 30 | 15 |

[1] 5A97 of Dow Chemical
[2] 0200 of Basell
[3] DS4D05 (14% butylene) of Dow Chemical
[4] DS6D20 (3.2% ethylene) of Dow Chemical
[5] DS6D81 (5.5% ethylene) of Dow Chemical
[6] EOD96-30 of Atofina In one embodiment, it is desired to subject the surface of at least one of the skin layers to a high-energy electrical discharge (or plasma) such as the high-energy electrical discharges produced by corona discharge and glow discharge which are well known in the industry. Corona discharge is a high-energy, high-ionizing discharge that is produced at electrodes when a high-voltage is applied across the plates of a condenser (capacitor). The corona discharge treatment improves the surface energy of the upper surface of the skin layer and improves the printability of the surface. Alternatively, the surface of at least one skin layer is subjected to variations of corona treatment such as covered roll, universal roll (also known as dual dielectric) and bare roll technologies. In another embodiment, flame treatment is used to treat the skin layer. The skin layers may be printed using conventional printing techniques. For example, gravure, flexographic and UV flexographic printing processes may be used. Water based, solvent based and UV curable inks may be used to print the skin layer. In one embodiment, the film is reverse printed with a design, image or text so that the print side of the skin is in direct contact with the container to which the film is applied.

As noted above, the core layer is relatively thick compared to the outer, e.g. skin layers. Thus, the core layer may be about 2 to 20 times as thick as each of the outer layers. Examples of thickness ratios of the core to the outer layers combined include 90:10, 80:20, 70:30 etc. The thickness ratios of the skin layer to the core and then to the other skin layer are 1-20:60-90:1-20, or 5-15:70-90:5-15. Thickness ratios for the three layered films include 5:90:5, 10:80:10, 15:70:15, 20:60:20, etc. The two skin layers do not have to be of equal thickness.

The core and skin layers may contain pigments, fillers, stabilizers, light protective agents or other suitable modifying agents if desired. The film may also contain anti-block, slip additives and anti-static agents. Useful anti-block agents include inorganic particles, such as clays, talc, calcium carbonate and glass. Slip additives useful in the present invention include polysiloxanes, waxes, fatty amides, fatty acids, metal soaps and particulate such as silica, synthetic amorphous silica and polytetrafluoroethylene powder. Anti-static agents useful in the present invention include alkali metal sulfonates, polyether-modified polydiorganosiloxanes, polyalkylphenylsiloxanes and tertiary amines The multilayer shrink film may be prepared by means known to those in the art. The film may be prepared by co-extrusion, extrusion coating or lamination.

As discussed above the films are uniaxially oriented. Uniaxially oriented films are stretched in only one direction. The films of the present invention are not biaxially oriented.

Machine direction orientation is accomplished by stretching the film as is known to those in the art. In one embodiment, the extruded sheet is stretched in the machine direction only, in a single-stage stretching process. FIG. 3 illustrates an apparatus 10 useful for the single-stage stretching of the film of the present invention. The extruded film proceeds through preheat rolls 1 and 2, and then draw rolls 3 and 4 where it is stretched. The film then passes through annealing rolls 5 and 6, and then to cooling rolls 7 and 8. In one embodiment of the single-stage stretching process, preheat rolls 1 and 2 are set at 220° F., draw rolls 3 and 4 are set at 230° F., annealing rolls 5 and 6 are set at 150° F., and cooling rolls 7 and 8 are set at 100° F. and 75° F., respectively. The draw ratio between draw rolls 3 and 4 is about 5.5:1. In general, films of the present invention typically have a stretch ratio from about 2 to about 9, or from about 3.5 to about 7, or from about 4 to about 6.

In another embodiment, the extruded sheet is uniaxially oriented using a two-stage stretching process wherein the extruded sheet is stretched twice in the machine direction. FIG. 4 illustrates an apparatus 20 useful for two-stage stretching of the film of the present invention. The extruded film proceeds through preheat rolls 21 and 22, and then draw rolls 23 and 24 where it is stretched. The film then passes through another set of preheat rolls 25 and 26, and then a second set of draw rolls 27 and 28 where it is again stretched. The film then passes through annealing rolls 29 and 30, and then to cooling rolls 31 and 32. In one embodiment of the two-stage stretching process, preheat rolls 21 and 22 are set at 230° F., draw rolls 23 and 24 are set at 245° F., preheat roll 25 is set at 260° F., preheat roll 26 and draw rolls 27 and 28 are set at 200° F., annealing rolls 29 and 30 are set at 150° F. and cooling rolls 31 and 32 are set at 100° F. and 75° F., respectively. The draw ratio between draw rolls 23 and 24 is about 4.5 to 1, and between draw rolls 27 and 28 is about 1.2–1.5:1.

In one embodiment of the present invention, the film has an ultimate shrinkage in the machine direction of at least 40% at 270° F. (132° C.). In other embodiments of the present invention, the film has an ultimate shrinkage in the machine direction of at least 50% at 280° F. and 60% at 290° F. (143° C.). In one embodiment, the film has an ultimate shrinkage in the machine direction of up to 80% at 310° F. (154° C.). The ultimate shrinkage of the film in the cross direction at temperatures up to 275° F. (135° C.) is less than 10% in one embodiment, and less than 4% in another embodiment.

Table 3 contains examples of multilayered films of the present invention. These films are prepared by coextrusion and are uniaxially oriented to a stretch ratio of 5.5:1.

TABLE 3

|  | Film 1 | Film 2 | Film 3 | Film 4 | Film 5 | Film 6 | Film 7 | Film 8 | Film 9 |
|---|---|---|---|---|---|---|---|---|---|
| Skin layer | S3 | S4 | S3 | S9 | S10 | S11 | S12 | S13 | S14 |
| Core layer | C3 | C5 | C5 | C9 | C10 | C11 | C11 | C11 | C12 |
| Skin layer | S3 | S4 | S3 | S9 | S10 | S11 | S12 | S13 | S14 |

The coextruded Film 4 had the properties listed below in Table 4:

TABLE 4

| Thickness (mil) | 2.0 |
|---|---|
| Haze (%) | 6.2 |
| Gloss (60°) | 95 |
| Tensile strength (psi) MD | 27,500 |
| Tensile strength (psi) CD | 3,000 |
| Tensile elongation (%) MD | 45 |
| Tensile elongation (%) CD | 850 |
| Secant Modulus (2%) (psi) MD | 170,000 |
| Secant Modulus (2%) (psi) CD | 88,000 |
| Shrink Onset Temp. (° F.) | 150 |
| Ultimate MD Shrinkage (%) at 275° F. (135° C.) | 45 |
| Ultimate CD Shrinkage (%) at 275° F. (135° C.) | 0 |

FIG. 5 shows the percent shrinkage in the machine direction as a function of the ultimate shrinkage temperature for Film 4. For comparison purposes, the percent ultimate shrinkage as a function of the shrinkage temperature for an oriented polypropylene film (OPP) commercially available from Mobil Oil under the designation ROSO is also shown. As illustrated by FIG. 5, the film of the present invention exhibits a higher ultimate shrinkage in the machine direction than the oriented polypropylene film at the same shrinkage temperature.

Films 6 to 9, as described above in Table 3, were prepared by coextruding the core and skin layers, followed by uniaxially orienting the film at the conditions shown in Table 5. The machine direction ultimate shrinkage (MD) for each of films 6 to 9 is listed in Table 5. The thickness of films 6–9 was 2 mils.

TABLE 5

| Film | 6 | 7 | 8 | 9 |
|---|---|---|---|---|
| Preheat (° F.) | 185 | 185 | 185 | 185 |
| Slow draw temp. (° F.) | 210 | 210 | 210 | 210 |
| Fast draw temp. (° F.) | 210 | 210 | 210 | 210 |
| Anneal temp. (° F.) | 195 | 195 | 195 | 195 |
| Stretch ratio | 5.5 | 5.5 | 5.5 | 5.5 |
| Anneal 1 | 5.363 | 5.363 | 5.363 | 5.363 |
| Relax % | 2.49 | 2.49 | 2.49 | 2.49 |
| Chill roll | 5.48 | 5.48 | 5.48 | 5.48 |
| Relax % | 0.36 | 0.36 | 0.36 | 0.36 |
| Ultimate MD shrink (275° F.) | 46.2 | 49.5 | 48.8 | 42.8 |

In one embodiment, the film has a high instantaneous shrinkage followed by a low rate of shrink. Films 10, 11 and 12 were each prepared by co-extruding a core layer of C11 and two skin layers of S11, followed by uniaxially orienting the film at the conditions shown in Table 6 below.

TABLE 6

| MDO Temperatures (° F.) | Film 10 | Film 11 | Film 12 |
|---|---|---|---|
| Preheat | 220 | 220 | 220 |
| Slow Draw | 230 | 230 | 200 |
| Fast Draw | 230 | 230 | 200 |
| Anneal | 200 | 150 | 150 |
| MDO Stretch Ratio | 5.5 | 5.5 | 5.5 |
| Anneal (% relax) | −4 | −4 | −4 |

Figure 6:
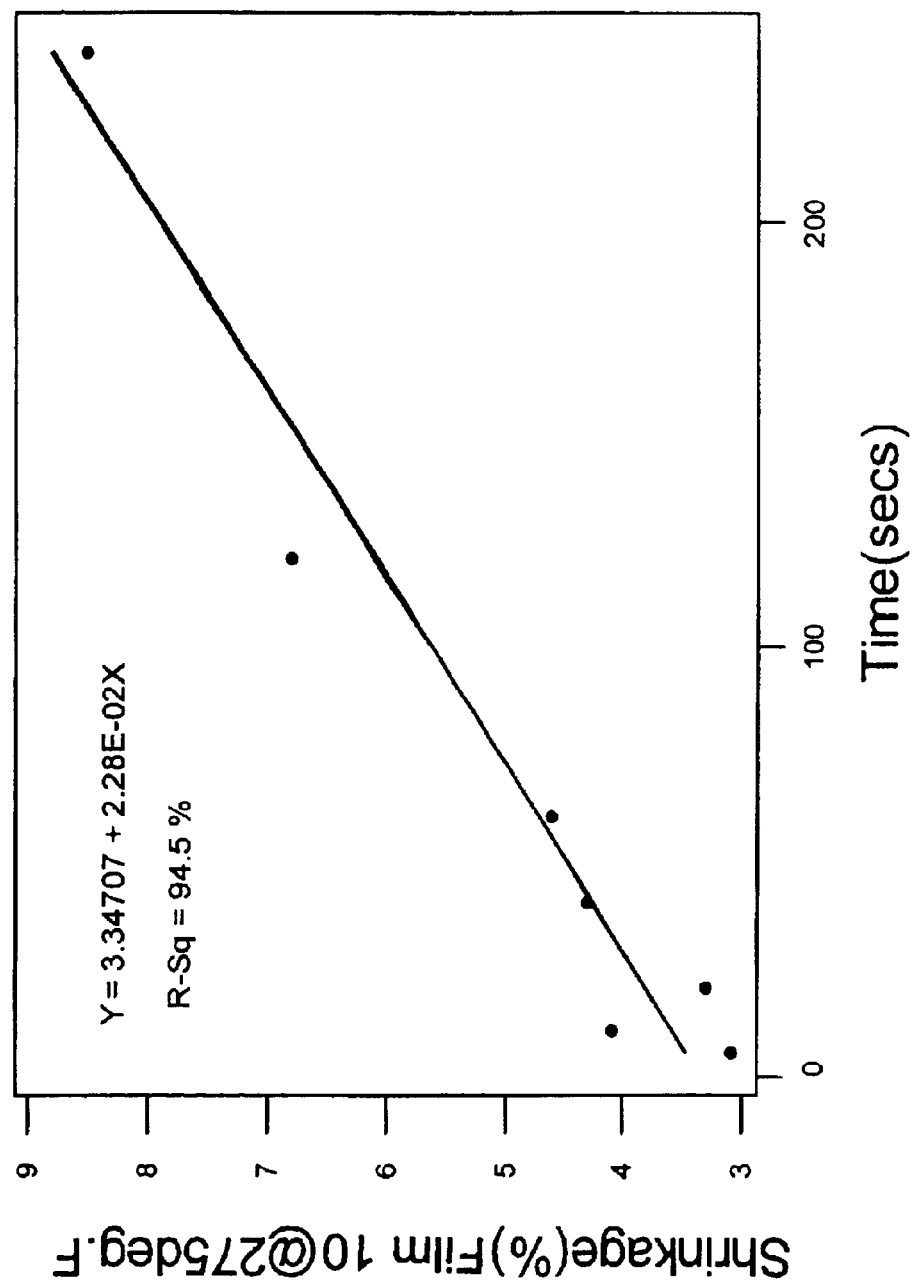
FIG. 6 is a plot of the percent shrinkage vs. time at a shrink temperature of 275° F. (135° C.) for the film of the present invention drawn at 230° F. (110° C.) and annealed at 200° F. (93° C.).
Figure 7:
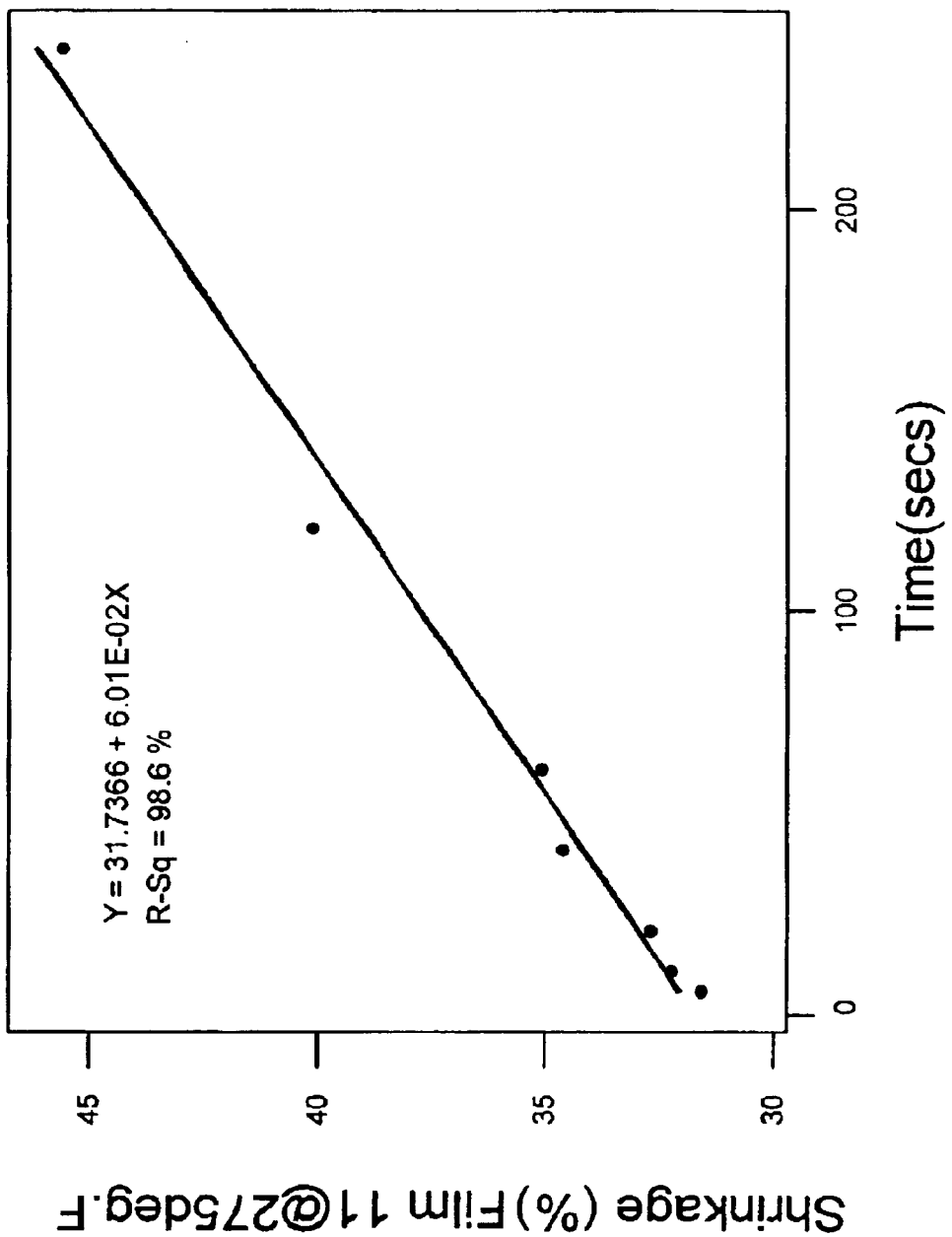
FIG. 7 is a plot of the percent shrinkage vs. time at a shrink temperature of 275° F. (135° C.) for the film of the present invention drawn at 230° F. (110° C.) and annealed at 150° F. (66° C.).
Figure 8:
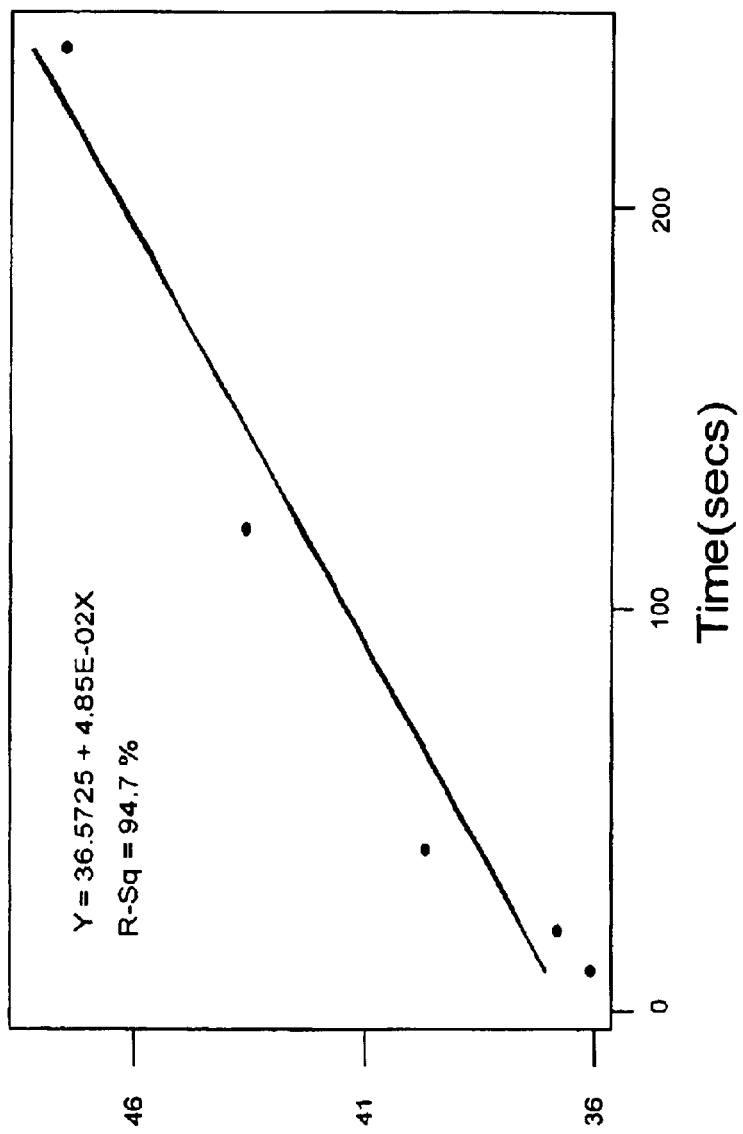
FIG. 8 is a plot of the percent shrinkage vs. time at a shrink temperature of 275° F. (135° C.) for the film of the present invention drawn at 200° F. (110° C.) and annealed at 150° F. (66° C.).

The instantaneous shrinkage was determined for each of Films 10–12 by plotting the shrinkage (%) versus time (sec.) at a shrinkage temperature of 275° F. FIGS. 6, 7 and 8 show the plots for Films 10, 11 and 12 respectively. The instantaneous shrinkage was obtained by extrapolating the plot for each film to determine the intersection of the line with the vertical axis. The rate of shrink was determined from the slope of the line for each film. Table 7 below lists the ultimate shrinkage, instantaneous shrinkage and the rate of shrink for each of Films 10, 11 and 12 at a shrink temperature of 275° F. (135° C.). The thickness of films 10, 11, and 12 was 2 mils.

TABLE 7

| Ultimate Shrinkage (%) | | | Instantaneous Shrinkage (%) | | | Rate of Shrink (%/sec) | | |
|---|---|---|---|---|---|---|---|---|
| Film 10 | Film 11 | Film 12 | Film 10 | Film 11 | Film 12 | Film 10 | Film 11 | Film 12 |
| 47.1 | 46.9 | 52.0 | 3.35 | 31.73 | 36.57 | 0.023 | 0.06 | 0.004 |

Figure 9:
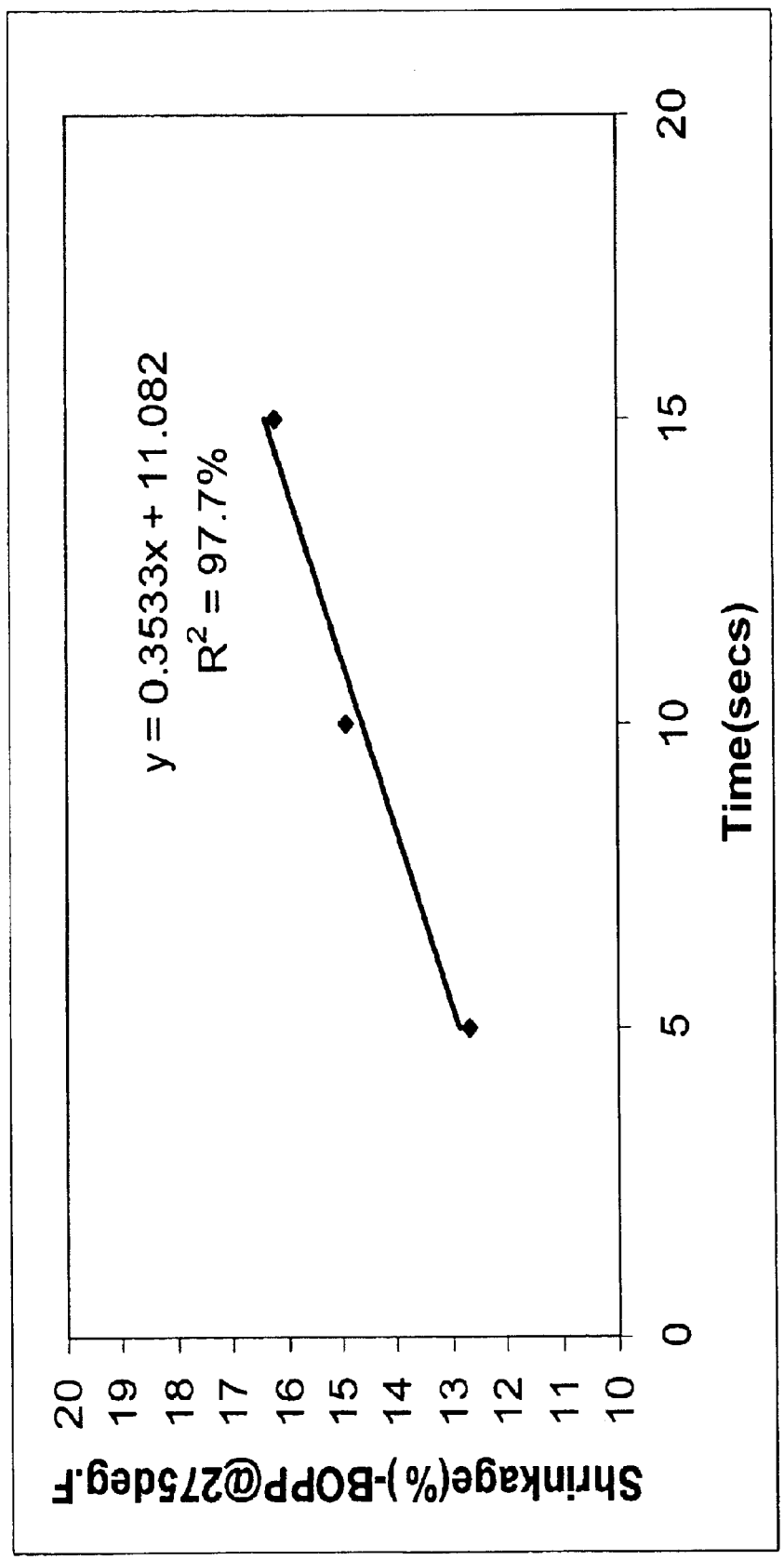
FIG. 9 is a plot of the percent shrinkage vs. time at a shrink temperature of 275° F. (135° C.) for a BOPP film.

With the films of the present invention, the high instantaneous shrinkage, combined with the low rate of shrinkage provides a shrink film than can be applied by the end user to a package or container in a relatively short shrink tunnel. This property of the film of the present invention can result in a significant cost savings to the end user. In one embodiment, the instantaneous shrinkage is at least 30% at 275° F. The shrink rate, in one embodiment is less than 0.1%/sec. For comparison purposes, the a plot of the shrinkage versus time for a biaxially oriented polypropylene film (BOPP) commercially available from Mobil Oil under the designation ROSO is shown in FIG. 9. The BOPP film does not have a high instantaneous shrinkage, nor does it have a low rate of shrinkage as shown in FIG. 9.

As described above, the films are useful in many shrink film applications. In one embodiment of a labeling process, a roll of the film is fed into a label applicator where a transport feed roller directs the film to a cutting station. At the cutting station, a cutting drum shear cuts the film into segments. The film segment, or label, is directed to the adhesive station where an adhesive strip is applied to both the leading edge and trailing edge of the label. A vacuum assisted drum then transfers the label to the article to be labeled. A UV lamp cures the adhesive on the leading and trailing edges of the label. The article with the affixed label is then sent through a heat shrink tunnel where the label shrinks to conform to the article. The label application process is a high-speed process.

Useful adhesives for such applications include adhesives that are capable of shrinking with the shrink film, at least 40%, and in one embodiment up to 80%, without adversely affecting the appearance of the film or becoming detached from the article. Such adhesives include hot melt adhesives and radiation curable adhesives. A particularly useful radiation curable adhesive comprises:

(a) a base resin, such as an epoxidized block copolymer (as described in U.S. Pat. No. 5,516,824 and U.S. Pat. No. 5,776,998); and/or a cycloaliphatic epoxy (such as CYRACURE UVI6110 available from Dow Chemical); an olefin including that having a C—C double bond pendant to the backbone or on ends—such materials may be oligomeric, polymeric or monomeric and the backbone may vary in polarity ranging from aliphatic, urethane, polyester and polyether);

(b) a photoinitiator, the type of which is dependent on the type of chemistry of the base resin, e.g., cationic photoinitator suitable for curing epoxidized block copolymer, cycloaliphatic epoxies, and vinyl ether olefins which includes sulfonium or iodonium salts such as SARCAT CD1010, SARCAT CD1011 and SARCAT CD1012 (available from Sartomer) and CYRACURE UVI 6974 available from Dow Chemical. For free-radical curing systems such as olefinic or thiol-ene curing systems the following photoinitiators may be suitable: IRGACURE 651, 184 and 1700 and DARO-CURE 1173, available from CIBA-GEIGY; as well as GENOCURE LBP available from Rahn; and ESA-CURE KIP150 available from Sartomer. Other examples of photoinitiators which may be used include one or more of the following: benzophenone, benzyldimethyl ketal, isopropyl-thioxanthone, bis(2,6-dimethoxybenzoyl)(2,4,4-trimethylpentyl) phosphineoxide, 2-hydroxy-2-methyl-1-phenyl-1-propanone, diphenyl(2,4,6-trimethybenzoyl) phosphine oxides, 1-hydroxycyclohexyl phenyl ketone, 2-benzyl-2-(dimethyl-amino)-1-4-(4-morpholinyl) phenyl-1-butanone, alpha,alpha-dimethoxy-alpha-phenylacetophenone, 2,2-diethoxyacetophenone, 2-methyl-1-4-(methylthio) phenyl-2-(4-morpholinyl)-1-propanone, 2-hydroxy-1-4-(hydroxyethoxy)phenyl-2-methyl-1-propanone.

(c) a tackifier, such as the $C_5$–$C_9$ hydrocarbon resins, synthetic polyterpenes, rosin, rosin esters, natural terpenes, and the like. More particularly, the useful tackifying resins include any compatible resins or mixtures thereof such as natural and modified rosins including gum rosin, wood rosin, tall oil rosin, distilled rosin, hydrogenated rosin, dimerized rosin, and polymerized rosin; glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified petaerythritol ester of rosin; copolymers and terpolymers of natural terpenes, such as styrene/terpene and alpha methyl styrene/terpene; polyterpene resons generally resulting from the polymerization of terpene hydrocarbons, such as the bicyclic monoterpene known as pinene, in the presence of Friedal-Crafts catalysts at moderately low temperatures; also included are the hydrogenated polyterpenes resins; phenolic modified terpene resins and hydrogenated derivatives thereof such as, for example, the resin product resulting from the condensation, in an acidic medium, of a bicyclic terpene and a phenol; aliphatic petroleum hydrocarbon resins resulting from the polymerization of monomers consisting primarily of olefins and diolefins; hydrogenated aliphatic petroleum hydrocarbon resins; and cyclic or acyclic $C_5$ resins and aromatic modified acyclic or cyclic resins. Mixtures of two or more of the above-described tackifying resins may be required. An example of a commercially available solid hydrogenated tackifer is ESCOREZ 5400 from Exxon. Examples of useful liquid tackifying resins include REGALITE R-10 a $C_5$ liquid tackifier with a softening point of 10° C. available from Hercules, and WINGTACK 10, a liquid hydrocarbon resin with a softening point of 10° C. available from Goodyear Chemical Co.;

(d) a diluent, such as a plasticizing or extending oil including olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Examples of useful mineral oils include refined hydrocarbon oils such paraffinic, aromatic and naphthalenic oils available under the trade designations KAYDOL from Witco, TUFFLO from Arco, and the like;

(e) a wax, such as a petroleum derived paraffinic or mycrocrystalline wax (including PACEMAKER 53 available from Citgo) is useful for altering the viscosity, green strength, and reducing tack of the final composition;

(f) a compatible polymer such as a block copolymer including polystyrene-polybutadiene-polystyrene, polystyrene-polyisoprene-polystyrene, poly(alphamethyl-styrene)-polybutadiene-poly(alpha-methyl-styrene), poly(alpha-methyl-styrene)-polyisoprene-poly(alpha-methylstyrene), as well as the hydrogenated modifications thereof, e.g., polystyrene-poly(ethylene-butylene)-polystyrene. These copolymers may be prepared by methods taught, for example, in U.S. Pat. Nos. 3,239,478; 3,247,269; 3,700,633; 3,753,936 and 3,932,327. For higher polarity systems, polymers such as polyesters (e.g. DYNAPOL materials available from Huls and sulfonated polyesters (available from Eastman under the AQ series) and acrylic polymers (such as ACRONAL AC205 and ACRONAL AC 258 available from BASF) which are also reactive with free-radical systems and non-reactive acrylics (such as those available from Schenectady Chemical). Other, non-limiting examples of additional materials include the following: SBR random copolymers with low (<20%) or high (>20%) vinyl contents, available under the trade name DURADENE from Firestone (these high vinyl copolymers are reactive and contribute to the crosslinking of the system); EPDM copolymers which can react into the polymer network via unsaturated sites, and saturated analogs (e.g. EP rubber) that can modify the peel and tack of the adhesive. These are available from Exxon under the trade name VISTALON; butyl rubber, which is a copolymer of isoprene and isobutylene and is available from Exxon Chemical under the trade name VISTANEX; and liquid polyisopropylene such as is available from Kuraray, Inc. under the trade name LIR;

(g) an alcohol-containing co-reactant for cationic curing systems which is often added to adjust crosslink density, Tg, viscosity and specific adhesion. Examples include, polyester polyols available from Stepan Chemical Company and from Dow Chemical; polyalkylene oxide polyols such as PEG and PPG available from Dow Chemical; aliphatic diols such as L-2203 available from Shell (this is an ethylene butylene diol); and L-1203 an ethylene butylene mono-ol available from Shell; also useful are polybutadiene polyols available from Atochem; epoxidized polybutadiene polyols for alcohols may also be used; and (h) other additives known to those skilled in the art. These additives may include, but are not limited to, pigments, fillers, fluorescent additives, flow and leveling additives, wetting agents, surfactants, antifoaming agents, rheology modifiers, stabilizers, and antioxidants. Preferred additives are those that do not have appreciable absorption in the wavelengths of interest.

In one embodiment, the radiation curable adhesive comprises (a) from about 5% by weight to about 60% by weight of at least one epoxidized block copolymer; (b) from about 20% by weight to about 85% by weight of at least one solid-hydrogenated tackifier; (c) about 0.02% by weight to about 5% by weight of at least one cationic photoinitiator; (d) about 0% by weight to about 40% by weight of at least one mineral oil; (e) about 0% by weight to about 40% by weight of at least one liquid tackifier; and (f) about 0% by weight to about 3% by weight of an anitoxidant.

In another embodiment, the radiation curable adhesive comprises (a) from about 10% by weight to about 50% by weight of at least one epoxidized cycloaliphatic base resin; (b) about 0.1% by weight to about 2.0% by weight of at least one cationic photoinitiator; (c) about 0% by weight to about 80% by weight of at least one solid or liquid polyester diol; and (d) about 0% by weight to about 60% by weight of at least one polar tackifier. Such radiation curable adhesives are described in European Patent Application, EP 1130070, incorporated herein by reference.

A particularly useful radiation curable adhesive is Contour™ adhesive available from National Starch.

The adhesive is used to affix the heat shrink labels to the article or container using conventional packaging equipment. Examples of packaging equipment and label applicators are disclosed in U.S. Pat. Nos. 4,749,428; 4,844,760; 4,923,557; 5,512,120; 5,855,710; 5,858,168 and 5,964,974, incorporated by reference herein. The adhesive may be applied to a portion of the outer surface of at least one of the skin layers by any known method. For example, the adhesive may be applied by spraying, dipping, rolling, gravure or flexographic techniques.

Alternatively, the adhesive may be applied directly to the article or container to be labeled. The label is then applied to the article and subjected to heat to shrink the label onto the container so as to affix the label to container.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A halogen-free, uniaxially oriented, multilayered heat shrink film comprising (A) a core layer comprising a polyolefin blend of (i) a copolymer of propylene with an alpha olefin and (ii) a homopolymer of butylene or propylene or a copolymer of butylene with an alpha olefin, the core having an upper and lower surface, (B) a first skin layer on the upper surface of the core layer, and (C) a second skin layer on the lower surface of the core layer, wherein the first and second skin layers independently comprise a copolymer of propylene with an alpha olefin, wherein the ultimate shrinkage of the film is at least 40% at 2700° F. (132° C.).

2. The film of claim 1 wherein the alpha olefin of the propylene copolymer of (A) comprises ethylene or butylene.

3. The film of claim 1 wherein the propylene copolymer of (A) comprises 1–20% by weight of the alpha olefin.

4. The film of claim 1 wherein the alpha olefin of the propylene copolymer of (A) comprises ethylene.

5. The film of claim 1 wherein the blend of (A) comprises (i) propylene copolymer and (ii) a butylene copolymer.

6. The film of claim 5 wherein butylene copolymer comprises a copolymer of butylene with ethylene.

7. The film of claim 1 wherein the blend of (A) comprises (i) a propylene copolymer and (ii) a homopolymer of polypropylene.

8. The film of claim 7 wherein the polypropylene homopolymer is syndiotactic polypropylene.

9. The film of claim 1 wherein (B) and (C) comprise a copolymer of propylene and ethylene having an ethylene content of about 1 to 6%.

10. The film of claim 1 wherein the skin layers (B) and (C) comprise a polyolefin blend of (i) a homopolymer of propylene or butylene and (ii) a copolymer of propylene with an alpha olefin.

11. The film of claim 10 wherein (B) and (C) comprise a blend of (i) a homopolymer of propylene and (ii) a propylene copolymer.

12. The film of claim 10 wherein the propylene copolymer comprises a copolymer of propylene with butylene or ethylene.

13. The film of claim 10 wherein the propylene copolymer comprises a copolymer of propylene with butylene.

14. The film of claim 10 wherein the propylene copolymer comprises a copolymer of propylene with ethylene.

15. The film of claim 1 wherein the instantaneous shrinkage of the film is at least about 30% at 275° F. (135° C.).

16. The film of claim 15 wherein the film has a rate of shrink of less than about 0.1%/sec.

17. The film of claim 1 wherein the ultimate shrinkage of the film is at least about 50% at 280° F. (138° C.).

18. The film of claim 1 wherein the ultimate shrinkage of the film is at least about 60% at 290° F. (143° C.).

19. The film of claim 1 wherein at least one skin layer further comprises an anti-block agent.

20. The film of claim 1 wherein at least one skin layer further comprises a slip additive.

21. The film of claim 1 wherein the core layer further comprises up to 35% recycled polyolefin.

22. A halogen-free, uniaxially oriented, multilayered heat shrink film comprising (A) a core layer comprising a polyolefin blend of (i) 50 to 95% by weight, based on the total weight of the blend, of a copolymer of propylene with an alpha olefin and (ii) 5 to 50% by weight, based on the total weight of the blend, of a homopolymer of propylene or butylene, or a copolymer of butylene with an alpha olefin, the core having an upper and lower surface, (B) a first skin layer on the upper surface of the core layer, and (C) a second skin layer on the lower surface of the core layer, wherein the first and second skin layers comprise a copolymer of propylene with an alpha olefin, wherein the ultimate shrinkage of the film is at least about 40% at 270° F. (132° C.).

23. A halogen-free, uniaxially oriented, multilayered heat shrink film comprising (A) a core layer comprising a polyolefin blend of (i) a copolymer of propylene with an alpha olefin and (ii) a homopolymer of butylene or propylene or a copolymer of butylene with an alpha olefin, the core having an upper and lower surface, (B) a first skin layer on the upper surface of the core layer, and (C) a second skin layer on the lower surface of the core layer, wherein the first and second skin layers independently comprise a polyolefin blend of (i) 30–85% by weight, based on the total weight of the blend, of a homopolymer of propylene or a homopolymer of butylene or a copolymer of butylene with an alpha olefin and (ii) 15–75% by weight, based on the total weight of the blend, of a copolymer of propylene with an alpha olefin, wherein the ultimate shrinkage of the film is at least 40% at 270° F. (132° C.).

24. The uniaxially oriented film of claim 23 wherein (B) and (C) comprise a blend of (i) a homopolymer of propylene and (ii) a copolymer of propylene and ethylene.

25. The film of claim 24 wherein the homopolymer of propylene comprises syndiotactic polypropylene.

26. A halogen-free, uniaxially oriented, multilayered heat shrink film label comprising (A) a core layer comprising a polyolefin blend of (i) a copolymer of propylene with an alpha olefin and (ii) a homopolymer of butylene or propylene or a copolymer of butylene with an alpha olefin, the core having an upper and lower surface; (B) a first skin layer on the upper surface of the core layer; (C) a second skin layer on the lower surface of the core layer, wherein the first and second skin layers independently comprise a copolymer of propylene with an alpha olefin; and (D) an adhesive coated on at least a portion of at least one of the skin layers, wherein the ultimate shrinkage of the film is at least about 40% at 270° F. (132° C.).

27. The label of claim 26 wherein the skin layers (B) and (C) comprise a polyolefin blend of (i) a homopolymer of propylene or a homopolymer of butylene or a copolymer of butylene with an alpha olefin and (ii) a copolymer of propylene with an alpha olefin.

28. The label of claim 26 wherein the adhesive is a radiation curable adhesive.

29. The label of claim 28 wherein the adhesive comprises (a) from about 5% by weight to about 60% by weight of at least one epoxidized block copolymer; (b) from about 20% by weight to about 85% by weight of at least one solid-hydrogenated tackifier; (c) about 0.02% by weight to about 5% by weight of at least one cationic photoinitiator; (d) about 0% by weight to about 40% by weight of at least one mineral oil; (e) about 0% by weight to about 40% by weight of at least one liquid tackifier; and (f) about 0% by weight to about 3% by weight of an anitoxidant.

30. The label of claim 28 wherein the adhesive comprises (a) from about 10% by weight to about 50% by weight of at least one epoxidized cycloaliphatic base resin; (b) about 0.1% by weight to about 2.0% by weight of at least one cationic photoinitiator; (c) about 0% by weight to about 80% by weight of at least one solid or liquid polyester diol; and (d) about 0% by weight to about 60% by weight of at least one polar tackifier.

31. A halogen-free, uniaxially oriented, multilayered heat shrink film comprising (A) a core layer comprising a polyolefin blend of (i) a copolymer of propylene with an alpha olefin and (ii) a homopolymer of butylene or propylene or a copolymer of butylene with an alpha olefin, the core having an upper and lower surface, (B) a first skin layer on the upper surface of the core layer, and (C) a second skin layer on the lower surface of the core layer, wherein the first and second skin layers independently comprise a copolymer of propylene with an alpha olefin, wherein the instantaneous shrinkage of the film is at least 30% at 275° F. (135° C.).

32. The film of claim 31 wherein the alpha olefin of the propylene copolymer of (A) comprises ethylene or butylene.

33. The film of claim 31 wherein the propylene copolymer of (A) comprises 1–20% by weight of the alpha olefin.

34. The film of claim 31 wherein the alpha olefin of the propylene copolymer of (A) comprises ethylene.

35. The film of claim 31 wherein the blend of (A) comprises (i) propylene copolymer and (ii) a butylene copolymer.

36. The film of claim 35 wherein butylene copolymer comprises a copolymer of butylene with ethylene.

37. The film of claim 31 wherein the blend of (A) comprises (i) a propylene copolymer and (ii) a homopolymer of polypropylene.

38. The film of claim 37 wherein the polypropylene homopolymer is syndiotactic polypropylene.

* * * * *

UNITED STATES PATENT AND TRADEMARK OFFICE
CERTIFICATE OF CORRECTION

PATENT NO.    : 6,808,822 B2
DATED         : October 26, 2004
INVENTOR(S)   : Rajan et al.

It is certified that error appears in the above-identified patent and that said Letters Patent is hereby corrected as shown below:

Column 16,
Line 35, replace "2700" with -- 270 --.

Signed and Sealed this

Eighth Day of February, 2005

JON W. DUDAS
*Director of the United States Patent and Trademark Office*